United States Patent
Pitwon et al.

(10) Patent No.: US 10,042,125 B2
(45) Date of Patent: Aug. 7, 2018

(54) OPTICAL CONNECTORS

(71) Applicant: Xyratex Technology Limited, Havant (GB)

(72) Inventors: Richard C. A. Pitwon, Fareham (GB); Alexander C. Worrall, Waterlooville (GB); Myles E. R. Spence, Portsmouth (GB); Alistair Allen Miller, Emsworth (GB)

(73) Assignee: Xyratex Technology Limited, Havant (GB)

( * ) Notice: Subject to any disclaimer, the term of this patent is extended or adjusted under 35 U.S.C. 154(b) by 54 days.

(21) Appl. No.: 14/792,308

(22) Filed: Jul. 6, 2015

(65) Prior Publication Data

US 2017/0010421 A1    Jan. 12, 2017

(51) Int. Cl.
*G02B 6/38*      (2006.01)

(52) U.S. Cl.
CPC ........... *G02B 6/3826* (2013.01); *G02B 6/389* (2013.01); *G02B 6/3869* (2013.01); *G02B 6/3873* (2013.01)

(58) Field of Classification Search
CPC .. G02B 6/3826; G02B 6/3869; G02B 6/3873; G02B 6/389
USPC .......................................................... 385/60
See application file for complete search history.

(56) References Cited

U.S. PATENT DOCUMENTS

| | | |
|---|---|---|
| 4,944,568 A | 7/1990 | Danbach et al. |
| 5,121,454 A | 6/1992 | Iwano et al. |
| 5,138,679 A | 8/1992 | Edwards et al. |
| 5,631,985 A | 5/1997 | Yamada et al. |
| 5,802,230 A * | 9/1998 | Kuribayashi ........ G02B 6/4246 385/88 |
| 6,033,125 A | 3/2000 | Stillie et al. |
| 6,196,856 B1 | 3/2001 | De Villeroche |
| 6,331,079 B1 | 12/2001 | Grois et al. |
| 6,419,399 B1 | 7/2002 | Loder et al. |
| 6,485,192 B1 | 11/2002 | Plotts et al. |
| 6,582,133 B2 | 6/2003 | Harris et al. |
| 6,672,771 B2 | 1/2004 | Cox et al. |
| 6,736,546 B2 | 5/2004 | Kiani et al. |
| 6,769,814 B2 | 8/2004 | Kiani et al. |
| 6,789,950 B1 | 9/2004 | Loder et al. |
| 6,837,625 B2 | 1/2005 | Schott et al. |
| 6,984,073 B2 | 1/2006 | Cox |
| 7,077,576 B2 | 7/2006 | Luther et al. |
| 7,329,053 B2 | 2/2008 | Sohmura et al. |
| 7,780,465 B2 | 8/2010 | Priyadarshi et al. |
| 8,064,207 B2 | 11/2011 | Wu |
| 8,622,632 B2 | 1/2014 | Isenhour et al. |
| 8,651,749 B2 | 2/2014 | Dainese Júnior et al. |
| 8,727,637 B2 | 5/2014 | Isenhour et al. |
| 8,781,273 B2 | 7/2014 | Benjamin et al. |
| 2002/0180554 A1 | 12/2002 | Clark et al. |

(Continued)

*Primary Examiner* — Jerry Blevins
(74) *Attorney, Agent, or Firm* — Mueting, Raasch & Gebhardt, P.A.

(57) ABSTRACT

Optical connectors may include various portions, or structures, to provide a plurality of degrees of movement to optical ferrules. The optical ferrules may be linearly movable along one or more axes and rotationally moveable about one or more axes for alignment and coupling to corresponding optical ferrules. The optical connectors may be integrated with, or in conjunction with, other non-optical connectors such as electrical connectors, e.g., located on a drive carrier.

11 Claims, 12 Drawing Sheets

(56) References Cited

U.S. PATENT DOCUMENTS

| | | | |
|---|---|---|---|
| 2003/0044123 A1* | 3/2003 | Kiani | G02B 6/3885 385/59 |
| 2003/0179990 A1* | 9/2003 | Weber | G02B 6/2931 385/27 |
| 2004/0009697 A1 | 1/2004 | Clark et al. | |
| 2005/0238290 A1* | 10/2005 | Choudhury | G02B 6/3882 385/59 |
| 2009/0041412 A1 | 2/2009 | Danley et al. | |
| 2011/0091162 A1 | 4/2011 | He et al. | |
| 2011/0142399 A1 | 6/2011 | Little et al. | |
| 2011/0142400 A1 | 6/2011 | Little et al. | |
| 2011/0158588 A1 | 6/2011 | Little et al. | |
| 2011/0176778 A1 | 7/2011 | Little et al. | |
| 2011/0317962 A1 | 12/2011 | Malehorn, II et al. | |
| 2015/0036984 A1* | 2/2015 | Wang | G02B 6/4214 385/89 |

* cited by examiner

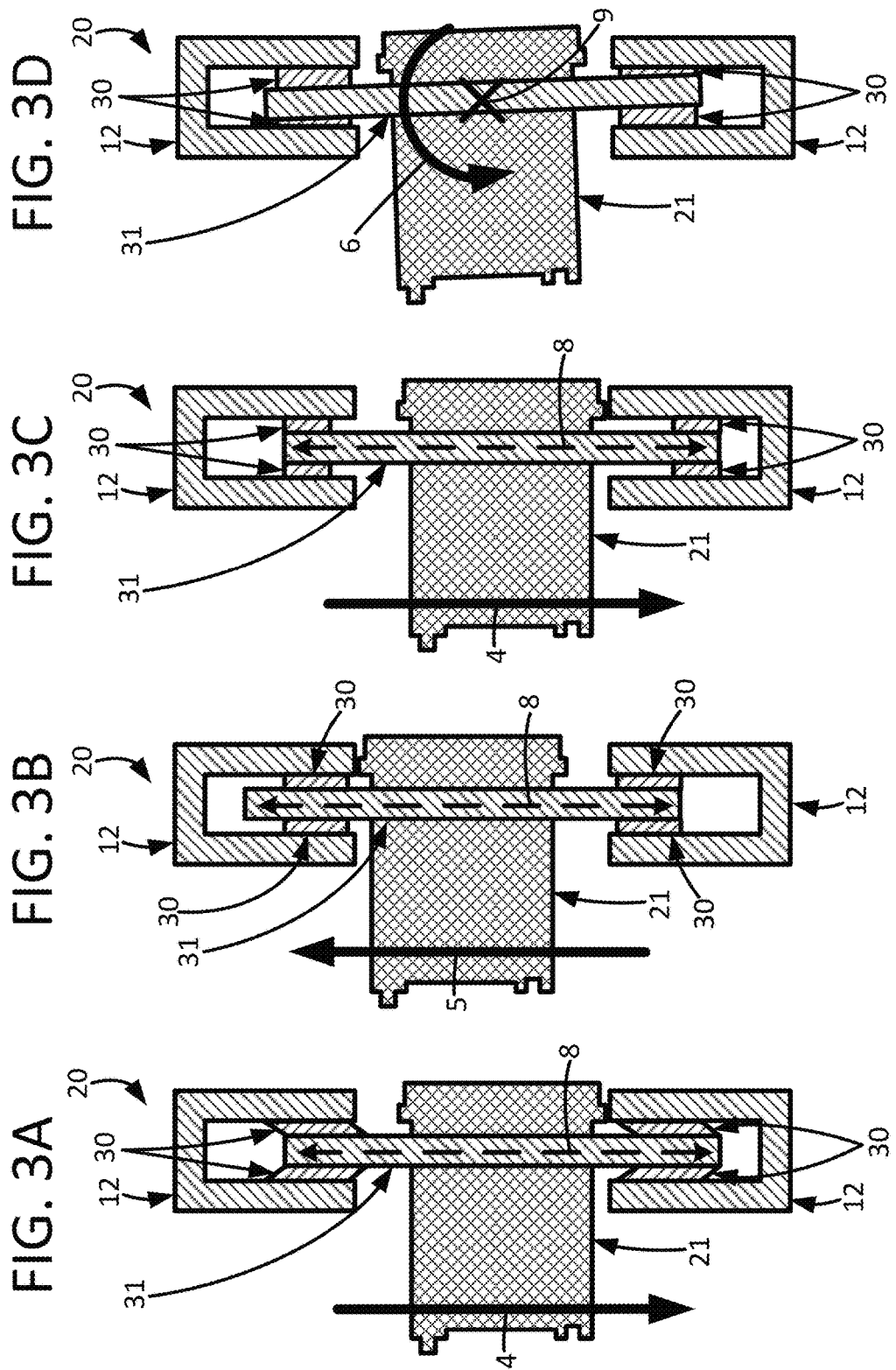

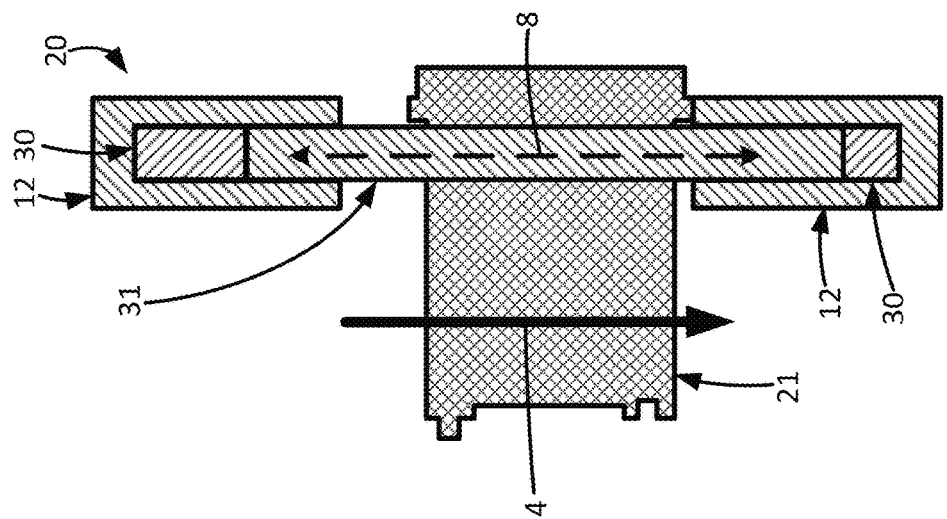
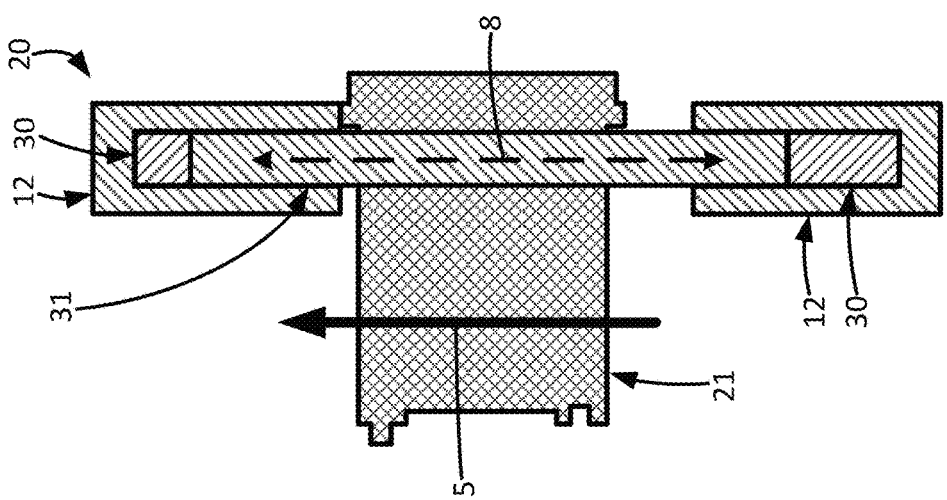

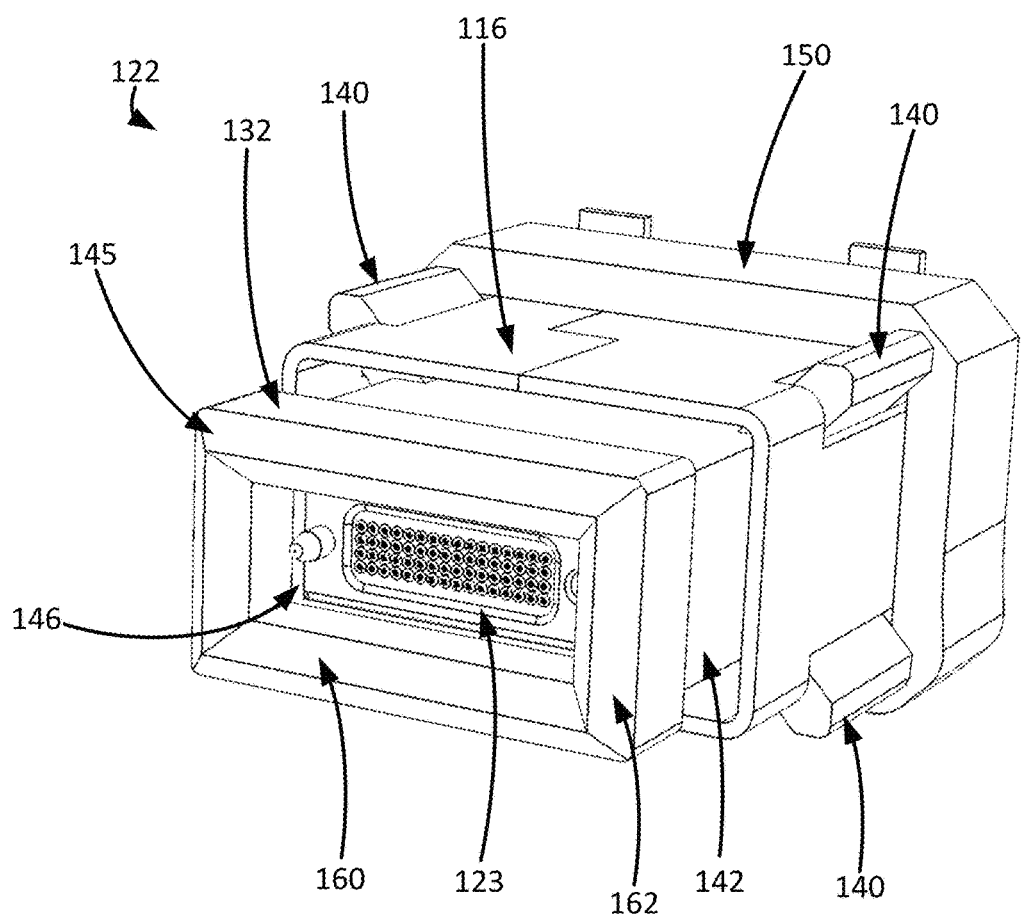

OPTICAL CONNECTORS

The disclosure herein relates to optical connectors for use in, e.g., electronic devices (e.g., storage devices, microservers, switches, etc.).

SUMMARY

One exemplary connector may include an optical ferrule portion and a resilient portion coupling the optical ferrule portion to a support. The optical ferrule portion may include an optical coupling to be coupled to a corresponding optical ferrule portion. The optical coupling may be aligned parallel to a first axis extending through the optical ferrule portion. The resilient portion may provide compliant linear movement of the optical ferrule portion with respect to the support portion along the first axis in either direction (e.g., greater than or equal to about 1 millimeter) and along a second axis in either direction (e.g., greater than or equal to about 1 millimeter) and compliant rotational movement about a third axis in either direction (e.g., greater than or equal to about 0.5 degrees) to align the optical ferrule portion with the corresponding optical ferrule portion for coupling the optical ferrule portion to the corresponding optical ferrule. The second axis may be perpendicular to the first axis and the third axis may be perpendicular to the first and the second axes.

One exemplary system may include a first optical ferrule portion movably coupled to a first support portion and including one or more optical couplings and a second optical ferrule portion movably coupled to a second support portion and including one or more optical couplings. The second optical ferrule portion may be configured to be coupled to the first optical ferrule portion to optically couple the one or more optical couplings of the second optical ferrule portion to the one or more optical couplings of the first optical ferrule portion. Further, the first and second optical ferrule portions may be movably coupled to the first and second support portions, respectively, to provide at least six degrees of movement collectively between the first optical ferrule portion and the first support portion and the second optical ferrule portion and the second support portion.

One exemplary method may include providing an optical ferrule portion including a plurality of optical couplings and an alignment feature. The plurality of optical couplings may be aligned parallel to a first axis extending through the optical ferrule portion. The optical ferrule portion may be movably coupled to a support portion to provide compliant linear movement of the optical ferrule portion along the first axis in either direction and along a second axis in either direction and to provide compliant rotational movement of the optical ferrule portion about a third axis in either direction. The second axis may be perpendicular to the first axis, and the third axis may be perpendicular to the first and the second axes. The exemplary method may further include moving the optical ferrule portion proximate, or proximate to, the corresponding ferrule portion to at least partially engage the alignment feature of the optical ferrule portion with a corresponding alignment feature of the corresponding ferrule portion and moving the optical ferrule portion at least one of along the first axis, along the second axis, and about the third axis with respect to the support portion in response to the engagement of the alignment feature of the optical ferrule portion with the corresponding alignment feature of the corresponding ferrule portion.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIGS. 3A-3D are diagrammatic views of exemplary optical connectors of the system of FIG. 2.

FIGS. 4A-4B are diagrammatic views of exemplary optical connectors of the system of FIG. 2.

FIG. 12 is a perspective view of the second exemplary optical connector of the system of FIG. 9.

DETAILED DESCRIPTION

Figure 1:
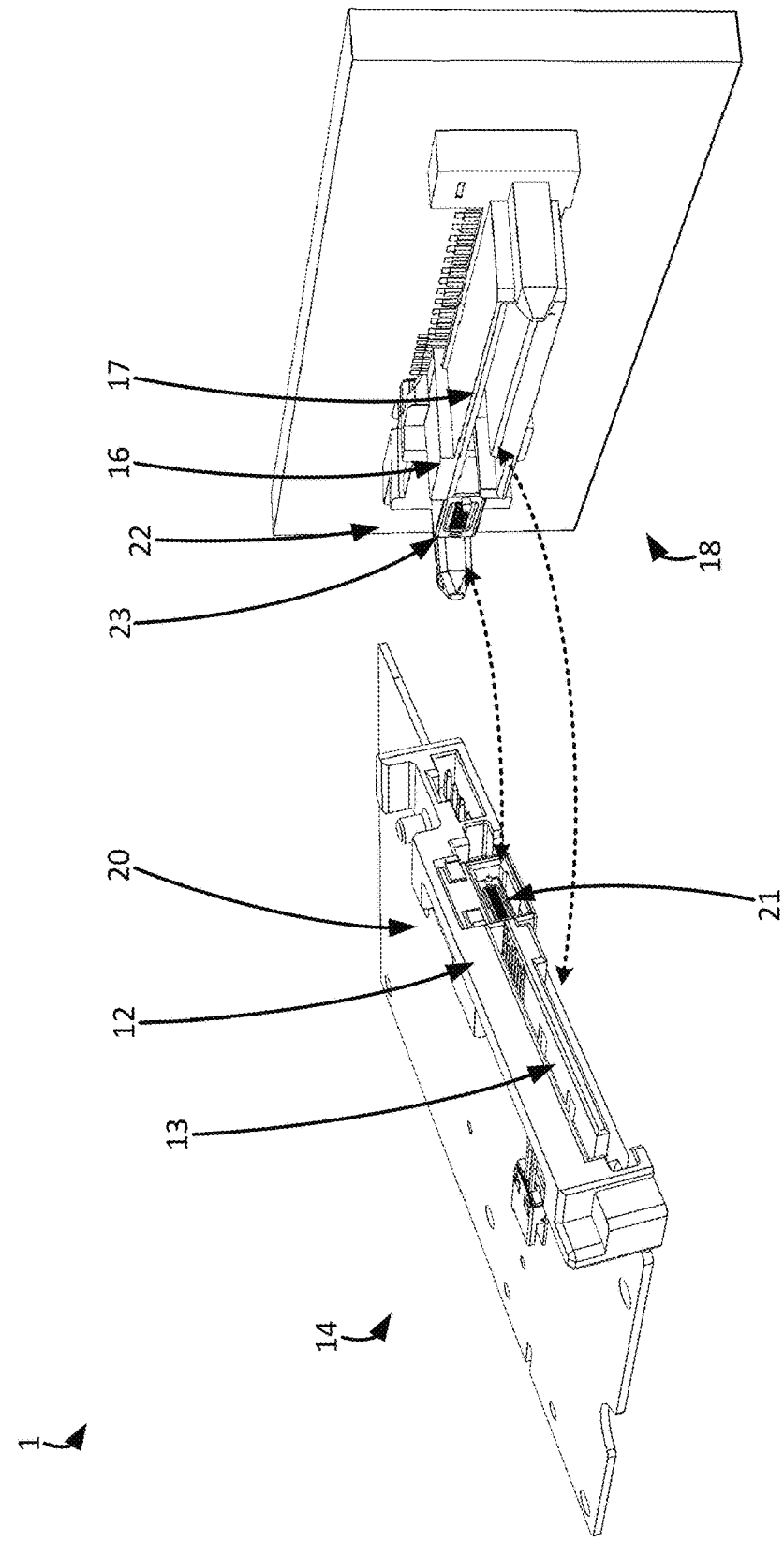
FIG. 1 is a perspective view of an exemplary system including a pair of couplable optical connectors.

The disclosure herein includes exemplary optical connector apparatus, structures, systems, and methods. The exemplary optical connector apparatus, structures, systems, and methods may include a pair of optical connectors configured to be coupled to each together. A pair of exemplary optical connectors may be referred to as "corresponding" optical connectors because, for example, a first optical connector of the pair of optical connectors may be coupled to a second, or "corresponding," optical connector of the pair of optical connectors.

Each optical connector may include at least an optical ferrule portion, and the optical ferrule portion may include, or define, one or more optical couplings. Each optical coupling may be an end facet of an optical fiber configured to transmit optical signals sent, or transmitted, over the optical fiber to be transmitted to another optical coupling, and likewise, be configured to receive optical signals transmitted from other optical couplings. In at least one embodiment, each optical coupling may utilize, or use, "expanded beam" fiber optic technology. As described herein, the optical connectors, and thus, the optical ferrules thereof, may be configured to be coupled to each other such that, e.g., the plurality of optical couplings of each optical ferrule may be coupled to each other to facilitate optical signal transmission therebetween. Although the optical ferrules may be generally described herein with respect to a plurality of optical couplings, it is to be understood that, in one or more embodiments, each optical ferrule may include a single optical coupling. Additionally, although the apparatus, structures, systems, and methods described herein are with respect to optical connectors, it is to be understood that such apparatus, structures systems, and methods may be used with, or in, different types of connectors, such as, e.g., electrical connectors, etc.

Alignment of optical couplings of optical ferrules with the corresponding optical couplings of a corresponding optical ferrules may be challenging, e.g., as optical couplings, optical fibers, etc. become smaller, increase in number per ferrule, become more tightly-packed on ferrules, etc. To facilitate alignment, the manufacturing tolerance of the optical connectors including the optical ferrules and alignment features may be decreased.

Additionally, optical connectors may be integrated with, or in conjunction with, other connectors such as electrical connectors. For example, the optical connectors may be coupled to, or integrated with, removable devices or modules configured to be used with a device enclosure. The device enclosure may be configured to receive a plurality of removable devices including a plurality of different removable devices and different connectors or interfaces (e.g., to electrically and/or optically couple the removable devices to the device enclosure and/or to each other). The removable devices may be data storage devices, networking devices, and/or computing devices. When the removable devices are data storage devices, the removable devices may be referred to as a disk drive carriers. Disk driver carriers as well as other removable devices may include non-optical connectors, or interfaces, such as an electrical connector, or interface, and may include an optical connector, or interface, that are configured to be coupled to corresponding non-optical and optical connectors at, or near, the same time or simultaneously. The non-optical connections, or couplings, of the non-optical connector (e.g., electrical connector) may be substantially larger that the optical couplings of the optical ferrules of the optical connector, and thus, the manufacturing tolerance of the non-optical connector and non-optical connector alignment features may be greater than the manufacturing tolerance of the optical connector including the optical ferrule and optical connector alignment features. Thus, if only using the alignment features of the non-optical connector (e.g., electrical connector), the non-optical connector may be properly aligned and coupled to the corresponding non-optical connector but the combined optical connector may not be properly aligned and coupled to a corresponding optical connector.

The exemplary optical connector apparatus, structures, systems, and methods described herein may include optical ferrule portions that are movable (e.g., compliantly movable) to facilitate proper alignment and coupling of optical couplings. For example, corresponding ferrule portions may be configured to provide at least six degrees of movement such as, e.g., linear movement along an x-axis, y-axis (i.e., perpendicular to the x-axis), and z-axis (i.e., perpendicular to the x and y-axes) and rotational movement about the x-axis, y-axis, and z-axis. In at least one embodiment, a ferrule portion may be configured to provide five of the six degrees movement while a corresponding ferrule portion may be configured to provide one degree of movement.

Additionally, the exemplary optical connector apparatus, structures, systems, and methods described herein may include resilient portions coupling the ferrule portions to support portions, or structures, (e.g., circuit boards, etc.) that are configured to provide the movement of the ferrule portions with respect to the support portions. The resilient portions may be described as being flexible and compliant. For example, the resilient portions may include (e.g., be formed of) resilient material such that the resilient portions are compressible under application of a force from a normal state (e.g., not stretched, uncompressed, etc.) to a deformed (e.g., stretched, compressed, etc.) state. Further, the resilient portions may return to the normal state when the force is removed. It may be described that the "normal state" may be defined as the shape and volume of the resilient portions before any external forces are applied to them (except, e.g., natural forces include gravity, air pressure, etc.) and the "deformed state" may be any shape and/or volume other than defined in the normal state.

Thus, although the resilient portions may be deformed, the resilient portions may also provide resistance, or compliance, to such deformation which may, e.g., allow resistive, or compliant, movement of the ferrule portions coupled, or attached, thereto. For example, a ferrule portion may be located in a normal location when the resilient portion coupled thereto is in a normal state, and when the ferrule portion is moved out of the normal location, e.g., by applying a force to the ferrule portion, the resilient portion may be placed, or configured, in a deformed state. Once the force is removed from the ferrule portion, the resilient portion may return to the normal state placing the ferrule portion back into the normal location.

The disclosure herein may be described as providing a low-cost electro-optical connectors, or interfaces, on one or more removable devices such as, e.g., disk drive carriers, micro-server-in-carriers, switch-in-carriers, hybrid-microserver-drive-in-carriers, etc. The exemplary optical connectors may include parallel multi-fibre/multi-waveguide ferrule portions (e.g., MT ferrules, MXC ferrules, etc.) that are arranged to fit within standard electrical high performance disk drive interfaces (e.g., SFF 8639). The exemplary optical connectors may be small enough, or sized such that, the optical connectors fit within existing non-optical connectors or interfaces. For example, standard electrical high performance disk drive interfaces may contain six ports to accommodate one or more different electrical interfaces such as, e.g., serially attached SCSI (SAS) interfaces, serial AT attachment (SATA) interfaces, or peripheral component interconnect express (PCIe) interfaces, or links, and by removing, e.g., two or four high-speed electrical links, a high density parallel optical fibre connector can be fit within the electrical connector form-factor. An exemplary optical connector may be configured to accommodate up to 64 high-speed channels. The removable devices may be described as defining a high density, small form factor that corresponds with, or mates, with a device enclosure configured to receive high density, small form factor devices. The exemplary optical connectors and portions thereof may be coupled to, or part of, the removable devices that exemplary optical connectors and portions thereof integrates, or fits, within the high density, small form factor.

Further, various embedded systems may fit inside disk drive carriers. Examples may include micro-server in carrier, high-speed-switch-in-carrier, high-density solid state drive (SSD) platforms, and hybrid variants. High density disk drive array enclosures may be adapted to accommodate a variety of different data centre systems in a future flexible modular converged framework, which may e.g., use the exemplary optical connectors described herein.

The optical connector apparatus, structures, systems, and methods may be described as providing backwards compatible electro-optical interfaces for device-in-carrier form factors. In at least one embodiment, a drive carrier, form-factor interface connector may be adapted to accommodate an exemplary pluggable, passive optical connector. The exemplary optical connector may be attached via an optical bus to an optical engine located somewhere on a printed circuit board (PCB), and optical bus may include, for instance, a loose or PCB-embedded fibre ribbon or waveguide array.

Further, it may be described that the exemplary apparatus, systems, structures, and methods may be configured to support an exemplary optical interface on or next to a conventional electrical connector. In other words, the exemplary apparatus, systems, structures, and methods may be described as being used to retrofit current technologies to enable insertion of such electro-optical device-in-carriers in either electro-optical or legacy enclosure infrastructures. The conventional alignment structures of the standard, e.g., electrical, connector may be used to provide coarse alignment. The exemplary optical connectors may be described as not including complex moving parts, such as springs or even shutters in this disclosure.

Exemplary apparatus, structures, systems, and methods shall be described with reference to FIGS. 1-12. It will be apparent to one skilled in the art that elements or processes from one embodiment may be used in combination with elements or processes of the other embodiments, and that the possible embodiments of such apparatus, structures, systems, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

An exemplary system 1 including a first optical connector 20 and a second, corresponding optical connector 22 is depicted in FIG. 1. The first optical connector 20 may be coupled to a first support portion 12 of a first device 14. The first device 14 may include a printed circuit board configured to include one or more electronic devices and one or more electrical traces for transmitting signals between the one or more devices. In one or more embodiments, the first device 14 is a removable device that may be a storage device (e.g., a solid state drive, hard disk drive, etc.), a server, a switch, a hybrid server/switch/storage device, etc. The second optical connector 22 may be coupled to a second support portion 16 of a second device 18. In one or more embodiments, the second device 18 may be a backplane of a device enclosure for containing, or receiving, one or more removable devices such as, e.g., storage devices, servers, switches, hybrid servers/switches/storage devices, etc.

The support portions 12, 16 may include electrical connectors 13, 17, respectively. The electrical connectors 13, 17 may correspond to each other such that the electrical connectors 13, 17 may be coupled together to electrically couple signals form the first device 14 to the second device 18. The electrical connectors 13, 17 may include one or more various corresponding alignment features such as, e.g., notches, pins, rails, etc. configured to align with each other when coupling the electrical connectors 13, 17 together. Such electrical connector alignment features may be referred to as "coarse" alignment features because, e.g., the electrical connectors 13, 17 are larger than the optical connectors 20, 22 so as to require less tolerance and less precise alignment.

The first optical connector 20 may include a first ferrule portion 21 and the second optical connector 22 may include a corresponding second ferrule portion 23. The ferrule portions 21, 23, are configured to be coupled together to optically couple the optical couplings thereon. To provide precise alignment of the optical couplings of the ferrule portions 21, 23, the exemplary optical connectors 20, 22 may include various structures and functionality (e.g., provided by the structures), e.g., to guide and move the ferrule portions 21, 23 as will be described herein.

Figure 2:
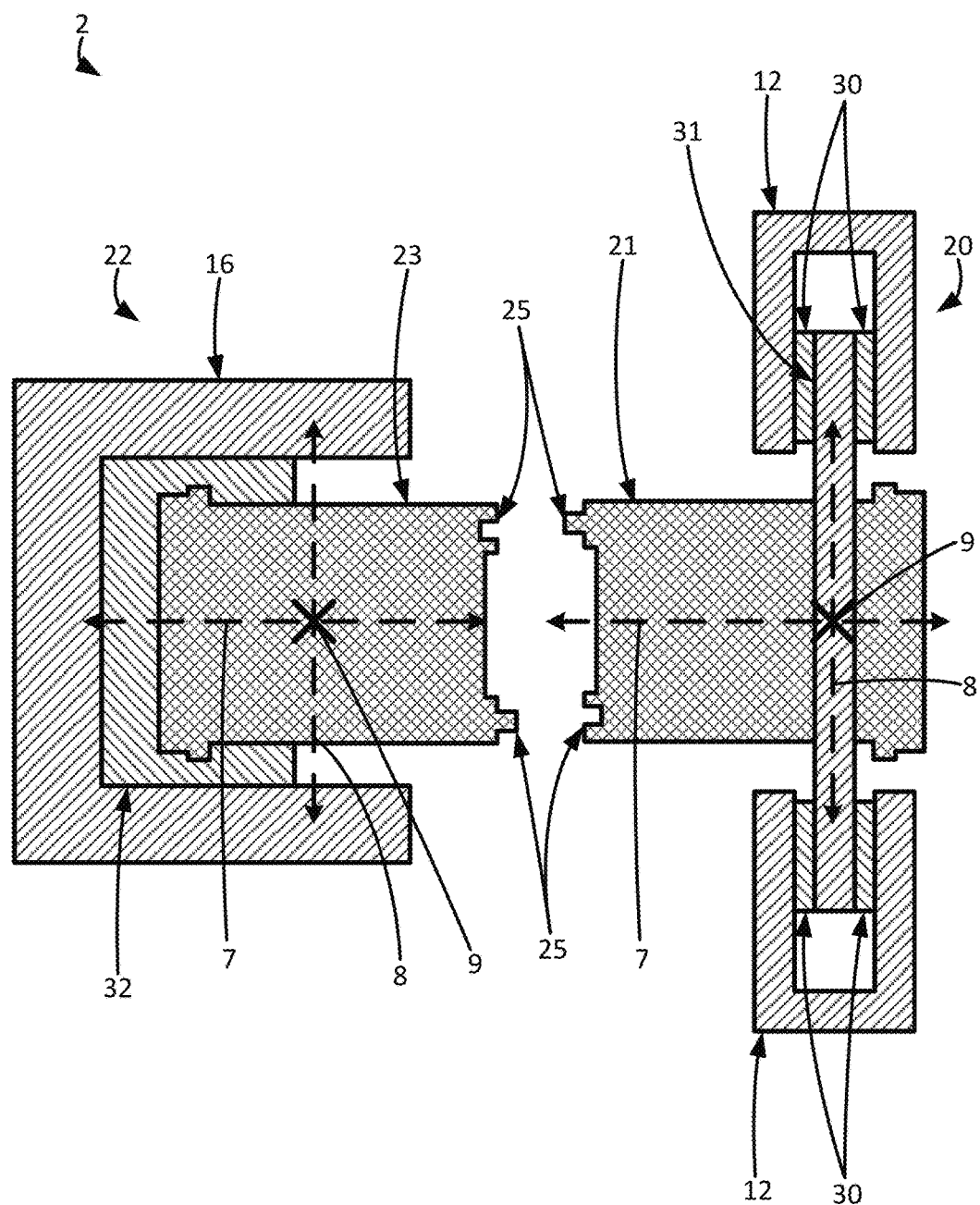
FIG. 2 is diagrammatic view of an exemplary optical connector system.

Top diagrammatic, cross-sectional views of exemplary optical connectors systems are depicted in FIGS. 2-4. The exemplary system 2 depicted in FIG. 2 depicts a first optical connector 20 including a first ferrule portion 21 and a second optical connector 22 including a second ferrule portion 23. As shown, each of the ferrule portions 21, 23 includes corresponding alignment features 25 (e.g., pins, holes for receiving such pins, etc.). Further, although not shown in FIGS. 2-4, the alignment features 25 that are pins may be tapered and rounded to provide and/or the alignment features 25 that are holes for receiving the pins may define a tapered opening. The alignment features 25 may be referred to as "fine" alignment features because, e.g., the ferrule portions 21, 23 and alignment features 25 are smaller that electrical connectors 13, 17 and the electrical connector alignment features described herein, the alignment features 25 may be used after first engaging "coarse" electrical connector alignment features. Further, although not shown in FIGS. 2-4, such "coarse" alignment features or other alignment features less "fine" than the alignment features 25 may be provided on or proximate the first and second connectors 20, 22 that, when engaged, may push or move the at least on ferrule portion 21, 23 laterally and/or rotationally (e.g., if not perfectly aligned) such that that the alignment features 25 (e.g., pins and holes) fall within engagement tolerances. Further embodiments in FIGS. 5-12 depict such alignment features and are described further herein.

The first optical connector 20 and the second optical connector 22 may be configured to provide a plurality of degrees of movement of the first and second ferrule portions 21, 23 to, e.g., align the first and second ferrule portions 21, 23 to be coupled together. In other words, the first optical connector 20 and the second optical connector 22 may be configured to allow the first and second ferrule portions 21, 23 to move about a plurality of degrees of movement to, e.g., align the first and second ferrule portions 21, 23 to be coupled together. It may be described that the first and second optical connector 20, 22 in combination, or collectively, provide the plurality of degrees of movement of the first and second ferrule portions 21, 23 because, e.g., each of the first and second optical connector 20, 22 may include less than all of the degrees of movement but each may include one or more degrees of movement that when combined provide all of the plurality of degrees of movement. For example, the first connector 20 may be configured to provide five degrees of movement of the first ferrule portion 21 and the second connector 22 may be configured to provide one degree of movement of the second ferrule portion 23 to combine to create six degrees of movement over, or between, the two connectors 20, 22. In other words, the first and second connectors 20, 22 may collectively provide six degrees of movement for the first and second ferrule portions 21, 23.

To provide such functionality, the first ferrule portion 21 may be coupled to a first resilient portion 30, and the first resilient portion 30 may be coupled to the first support portion 12. In other words, the first ferrule portion 21 may be coupled to the first support portion 12 via the first resilient portion 30. Additionally, in this example, the first ferrule portion 21 is coupled to the first resilient portion 30 using a wing portion 31. In other words, the first ferrule portion 21 may be coupled to the wing portion 31, and the wing portion 31 may be coupled to the first support portion 12. The wing portion 31 may be configured to provide vibration damping to, e.g., reduce vibration of optical connections/couplings, isolate optical connections/couplings from system vibrations, etc. Further, the wing portion 31 may include (e.g., be made from) vibration damping, or energy control, material such as, e.g., one or more polymers, one or more rubber materials, any elastomeric or resilient foam compounds, etc. The wing portion 31 may be referred to as a "gasket" attached to and surrounding the first ferrule portion 21. As such, it may be described that the first support portion 12 is indirectly coupled to the first ferrule portion 21 through the first resilient portion 30 and the wing portion 31.

The first resilient portion 30 may include one or more parts or portions. However, as shown, the first resilient portion 30 appears as four portions due to the top, cross-sectional nature of the views depicted herein. Nonetheless, it is to be understood that the first resilient portion 30 may be a single portion or may include multiple portions.

Likewise, the second ferrule portion 23 may be coupled to a second resilient portion 32, and the second resilient portion 32 may be coupled to the second support portion 16. In other words, the second ferrule portion 23 may be coupled to the second support portion 16 via the second resilient portion 32. As such, it may be described that the second support portion 16 is indirectly coupled to the second ferrule portion 23 through the second resilient portion 32. Similar to the first resilient portion 30, the second resilient portion 32 may be a single portion or may include multiple portions.

As shown, the first ferrule portion 21 and the second ferrule portion 23 may be described as extending, or lying, along a first, or axial, axis 7. More specifically, the optical couplings of the first and second ferrule portion 21, 23 may described as extending parallel to the first axis 7. The axis 7 may be referred to as the insertion/extraction (or insertion/restriction) axis because the substantially linear movement used to couple the first ferrule portion 21 to the second ferrule portion 23 may extend along the axis 7. Further, the first axis 7 of each of the first and second ferrule portions 21, 23 will be aligned, as depicted, because the first and second ferrule portions 21, 23 are substantially aligned.

Additionally, a second axis 8 perpendicular to the first axis 7 and a third axis 9 perpendicular to the first and second axes 7, 8 may be defined for each of the first ferrule portion 21 and the second ferrule portion 23. The second axis 8 is shown extending along the plane defined by the page and the third axis 9 is represented by an "X," which indicates that the third axis extends out of and perpendicular to the page. Such first, second, and third axes 7, 8, 9 will be used herein to described the movements of the ferrule portions 21, 23 with respect to their corresponding support portions 12, 16.

The first ferrule portion 21 may be described as being movably coupled to the first support portion 12 via the resilient portion 30 to provide linear movement of the first ferrule portion 21 along the second and third axes 8, 9 in either direction and to provide rotational movement of the first ferrule portion 21 about the first, second, and third axes 7, 8, 9 in either direction (e.g., clockwise direction and counterclockwise direction). For example, the compliance, or give, of the first resilient portion 30 may allow the first ferrule portion 21 to move in either direction linearly along the second and third axes 8, 9 and rotationally (e.g., in the clockwise direction or counterclockwise direction) about the first, second, and third axes 7, 8, 9 when force is applied to the first ferrule portion 21. The force applied to the first ferrule portion 21 may originate from, or be applied from, the alignment features such as alignment features 25 or others not shown of the first ferrule portion 21 when engaging with alignment features of the second ferrule portion 23. For example, the alignment features 25 may guide the ferrule portions 21, 23 to proper alignment and coupling by applying a force to the ferrule portions 21, 23, which may move the ferrule portions 21, 23 into alignment while the resilient portions 30, 32 allow such compliant movement. In the first connector 20, the first resilient portion 30 may be described as providing or allowing linear movement in the plane traverse to the x-axis 7 and rotational movement about the x, y, and z-axes 7, 8, 9 to align the first ferrule portion 21 with the second ferrule portion 23 of the second connector 22.

Further, the first resilient portion 30 may allow, or provide, linear movement of the first ferrule portion 21 in either direction (e.g., forward direction or opposite reverse direction) along the second axis 8 and/or the third axis 9 that is greater than or equal to about 0.1 millimeters, greater than or equal to about 0.2 millimeters, greater than or equal to about 0.3 millimeters, greater than or equal to about 0.4 millimeters, greater than or equal to about 0.5 millimeters, greater than or equal to about 0.75 millimeters, greater than or equal to about 1.0 millimeter, greater than or equal to about 1.25 millimeters, greater than or equal to about 1.5 millimeters, etc. and/or less than or equal to about 3.0 millimeters, less than or equal to about 2.0 millimeters, less than or equal to about 1.75 millimeters, less than or equal to about 1.5 millimeters, less than or equal to about 1.3 millimeters, less than or equal to about 0.9 millimeters, less than or equal to about 0.7 millimeters, less than or equal to about 0.55 millimeters, less than or equal to about 0.4 millimeters, etc.

Additionally, the first resilient portion 30 and (e.g., in conjunction with) the first support portion 12 may be configured to restrict linear movement of the first ferrule portion 21 along the first axis 7. For example, the first resilient portion 30 and the first support portion 12 may be configured to restrict linear movement of the first ferrule portion 21 along the first axis 7 to less than or equal to about 1.0 millimeters, less than or equal to about 0.5 millimeters, less than or equal to about 0.3 millimeters, less than or equal to about 0.2 millimeters, etc. In at least one embodiment, the first resilient portion 30 and the first support portion 12 may be configured to restrict linear movement of the first ferrule portion 21 along the first axis 7 to between about 0.3 millimeters and about 0.6 millimeters.

Still further, the first resilient portion 30 and (e.g., in conjunction with) the first support portion 12 may allow rotational movement of the first ferrule portion 21 about the first, second, and third axes 7, 8, 9 in the clockwise and/or counterclockwise directions (e.g., plus or minus degrees) to less than or equal to about 4.0 degrees, less than or equal to about 3.0 degrees, less than or equal to about 2.5 degrees, less than or equal to about 2.25 degrees, less than or equal to about 2.0 degrees, less than or equal to about 1.75 degrees, less than or equal to about 1.5 degrees, less than or equal to about 1.25 degrees, less than or equal to about 1.0 degree, less than or equal to about 0.7 degrees, less than or equal to about 0.5 degrees, less than or equal to about 0.3 degrees, etc. and/or greater than or equal to about 0.1 degrees, greater than or equal to about 0.2 degrees, greater than or equal to about 0.3 degrees, greater than or equal to about 0.4 degrees, greater than or equal to about 0.5 degrees, greater than or equal to about 0.6 degrees, greater than or equal to about 0.7 degrees, greater than or equal to about 0.9 degrees, greater than or equal to about 1.1 degrees, greater than or equal to about 1.3 degrees, greater than or equal to about 1.4 degrees, greater than or equal to about 1.6 degrees, etc.

The second ferrule portion 23 may be described as being movably coupled to the second support portion 16 via the second resilient portion 32 to provide linear movement of the second ferrule portion 23 along the first axis 7 in either direction (e.g., forward direction or opposite reverse direction along the first axis 7). For example, the compliance, or give, of the second resilient portion 32 may allow the second ferrule portion 23 to move in either direction along the first axis 7 when force is applied to the second ferrule portion 23. The force applied to the second ferrule portion 23 may originate from, or be applied from, the alignment features such as alignment features 25 or others not shown of the first ferrule portion 21 when engaging with alignment features of the second ferrule portion 23. For example, the alignment features 25 may guide the ferrule portions 21, 23 to proper alignment and coupling by applying a force to the ferrule portions 21, 23, which may move the ferrule portions 21, 23 into alignment while the resilient portions 30, 32 allow such compliant movement.

For example, the second resilient portion 32 may provide linear movement of the second ferrule portion 23 in either direction along the first axis 7 that is greater than or equal to about 0.5 millimeters, greater than or equal to about 0.7 millimeters, greater than or equal to about 1.0 millimeter, greater than or equal to about 1.5 millimeters, greater than or equal to about 2.0 millimeters, etc. and/or less than or equal to about 5.0 millimeters, less than or equal to about 4.0 millimeters, less than or equal to about 3.0 millimeters, less than or equal to about 2.5 millimeters, less than or equal to about 2.2 millimeters, less than or equal to about 1.7 millimeters, less than or equal to about 1.1 millimeters, etc.

It may be described the resilient portions 30, 32 also provide engagement forces after the connection between ferrule portions 21, 23 has been made if the engagement distance along the first axis 7 continues beyond the contact point of the two ferrule portions 21, 23. Further, the engagement forces provided by the compliancy of the resilient portions 30, 32 may keep the ferrule portions 21, 23 coupled together after initially coupled.

Additionally, the second resilient portion 32 may be configured to restrict linear movement of the second ferrule portion 23 along the second and third axes 8, 9 and to restrict rotational movement of the second ferrule portion 23 about the first, second, and third axes 7, 8, 9. For example, the second resilient portion 32 may be configured to restrict linear movement of the second ferrule portion 23 along one or more of the second and third axes 8, 9 to less than or equal to about 1.0 millimeters, less than or equal to about 0.5 millimeters, less than or equal to about 0.3 millimeters, less than or equal to about 0.2 millimeters, etc. For example, the second resilient portion 32 may be configured to restrict rotational movement of the second ferrule portion 23 about one or more of the first, second, and third axes 7, 8, 9 to less than or equal to about 2.0 degrees, less than or equal to about 1.5 degrees, less than or equal to about 1.0 degree, less than or equal to about 0.7 degrees, less than or equal to about 0.5 degrees, less than or equal to about 0.3 degrees, etc.

The first and second connectors 20, 22 may be configured in multiple different ways and include multiple different structures in various arrangements to provide the functionality and properties described herein. A few exemplary first connectors are depicted in FIGS. 3-4.

Each of the exemplary first connectors 20 in FIGS. 3A-3D include first resilient portions 30 that are not located along the same plane as the wing portion 31. For example, the first resilient portions 30 may be described as being located adjacent the wing portion 31 and/or being located adjacent the plane defined by the wing portion 31 in FIGS. 3A-3D. Conversely, each of the exemplary first connectors 20 in FIGS. 4A-4B include first resilient portions 30 that are located along, or within, the same plane as the wing portion 31. For example, the first resilient portions 30 may be described as being located within the plane defined by the wing portion 31 and/or along the edges or ends of the wing portion 31 in FIGS. 4A-4B.

An exemplary first connector 20 in which the first ferrule portion 21 has been linearly moved along the second axis 8 in direction 4 is shown in FIG. 3A. In this embodiment, the first resilient portion 30 is fixedly coupled to the first support portion 12 and the wing portion 31. When a force is applied (e.g., by corresponding alignments features of another connector when coupling therewith) to move the first ferrule portion 21 along the second axis 8 (and/or third axis 9), the first resilient portion 30 may flex, or deform, to allow, or provide, the compliant movement of the first ferrule portion 21 along the second axis 8 (and/or third axis 9). When the force is removed, the compliancy of the first resilient portion 30 may return, or move, the first ferrule portion 21 back to the location in which the first ferrule portion 21 was located prior to the force being applied. In other words, the first resilient portion 30 may "spring back" the first ferrule portion 21 to its original, or natural, location. In the example depicted, the first resilient portion 30 may move the first ferrule portion 21 opposite direction 4 back to the original position.

An exemplary first connector 20 in which the first ferrule portion 21 has been linearly moved along the second axis 8 in direction 5 is shown in FIG. 3B. In this embodiment, the first resilient portion 30 is fixedly coupled to the first support portion 12 but not fixedly coupled to the wing portion 31. The first resilient portion 30 and the wing portion 31 are configured (e.g., sized, etc.) to allow the wing portion 31 to slide at least along the second axis 8 (and/or third axis 9) to provide, or allow, linear movement of the first ferrule portion along the second axis 8 (and/or third axis 9). When a force is applied (e.g., by corresponding alignments features of another connector when coupling therewith) to move the first ferrule portion 21 along the second axis 8 (and/or third axis 9), the first resilient portion 30 may allow the wing portion 31 to slide along the second axis 8 (and/or third axis 9) thereby moving the first ferrule portion 21 along the second axis 8 (and/or third axis 9) in direction 5.

An exemplary first connector 20 in which the first ferrule portion 21 has been linearly moved along the second axis 8 in direction 4 is shown in FIG. 3C. In this embodiment, the first resilient portion 30 is not fixedly coupled to the first support portion 12 but is fixedly coupled to the wing portion 31. The first resilient portion 30 and the first support portion 12 are configured (e.g., sized, etc.) to allow the wing portion 31 to slide at least along the second axis 8 (and/or third axis 9) to provide, or allow, linear movement of the first ferrule portion along the second axis 8 (and/or third axis 9). When a force is applied (e.g., by corresponding alignments features of another connector when coupling therewith) to move the first ferrule portion 21 along the second axis 8 (and/or third axis 9), the first support portion 12 allows the resilient portion 30 and the wing portion 31 to slide along the second axis 8 (and/or third axis 9) thereby allowing the first ferrule portion 21 to move along the second axis 8 (and/or third axis 9).

An exemplary first connector 20 in which the first ferrule portion 21 has been rotationally moved about the third axis 9 in direction 6 is shown in FIG. 3D. In this embodiment, the first resilient portion 30 may or may not be fixedly coupled to the first support portion 12 and/or the wing portion 31. The first resilient portion 30, the first support portion 12, and/or the wing portion 31 are configured (e.g., sized, etc.) to allow compression and expansion of the first resilient portion 30 to provide, or allow, rotational movement of the first ferrule portion 21 about the about the third axis 9 (and/or first and second axes 7, 8). When a force is applied (e.g., by corresponding alignments features of another connector when coupling therewith) to move the first ferrule portion 21 about third axis 9 (and/or first and second axes 7, 8), the first resilient portion 30 may compress and expand to allow the first ferrule portion 21 to rotate about the third axis 9 (and/or first and second axes 7, 8) in direction 6 (e.g., counterclockwise direction). When the force is removed, the compliancy of the first resilient portion 30 may move, or return, (e.g., rotate) the first ferrule portion 21 back to the location in which the first ferrule portion 21 was located prior to the force being applied. In other words, the first resilient portion 30 may "spring back" the first ferrule portion 21 to its original, or natural, location. In the example depicted, the first resilient portion 30 may move the first ferrule portion 21 opposite direction 6 (e.g., clockwise) back to the original position.

An exemplary first connector 20 in which the first ferrule portion 21 linearly moved along the second axis 8 in direction 4 is shown in FIG. 4A and linearly moved along the second axis 8 in direction 5 is shown in FIG. 4B. In this embodiment, the first resilient portion 30 is located between the first support portion 12 and the end, or perimeter, regions of the wing portion 31. When a force is applied (e.g., by corresponding alignments features of another connector when coupling therewith) to move the first ferrule portion 21 along the second axis 8 (and/or third axis 9), the first resilient portion 30 may be compressed and expanded to allow, or provide, the compliant movement of the first ferrule portion 21 along the second axis 8 (and/or third axis 9). When the force is removed, the compliancy of the first resilient portion 30 may move the first ferrule portion 21 back to the location in which the first ferrule portion 21 was located prior to the force being applied. In other words, the first resilient portion 30 may "spring back" the first ferrule portion 21 to its original, or natural, location. For example, the first resilient portion 30 may move the first ferrule portion 21 opposite direction 5 back to the original position in FIG. 4A and may move the first ferrule portion 21 opposite direction 4 back to the original position in FIG. 4B.

As described herein, an exemplary optical connector may be mechanically attached to an electrical connector in order to make use of the guiding structures of the electrical connector for coarse initial alignment. In one or more embodiments, the exemplary optical connector may be located as closely to the alignment structures of the conventional connector. Further, in one or more embodiments, an exemplary ferrule portion of the connector may be fixed coupled to the remainder of the connector with no compliance. In another embodiment, an exemplary ferrule portion of the connector may not fixed coupled, and instead, movable coupled to the remainder of the connector with some compliance. In one or more embodiments, compliance may be required on one or both corresponding connectors (e.g., plug and receptacle). For example, in at least one embodiment, a ferrule portion may have a gasket brace, that is, e.g., firmly mechanically attached to the ferrule portion. The gasket brace may have wings designed to engage with a brace holder. The brace holder may be mechanically attached, or part of, a standard electrical connector interface (e.g., a SFF 8639 connector). The brace holder may be configured to allow transverse and rotational movement of the ferrule portion but support the effectively floating ferrule portion against strong axial forces (e.g., linear forces along an insertion/extraction axis extending through the ferrule portion) during insertion or extraction. Further, the wings, or wing portions, of the gasket brace attached the optical ferrule portion may be designed to fit into recesses in the brace holder such as, e.g., to enable transverse movement in a plane normal to the axis of drive carrier insertion or retraction. Still further, in at least on embodiment, a film of compliant, elastic, and/or spongy material (e.g., returns to original form when forces acting upon it are removed) attached either to the gasket wings or the brace holder recess to allow full rotational compliancy (e.g., less than or equal to about 2 degrees of rotational movement in the clockwise or counterclockwise, or plus or minus, directions) as well as limited axial compliancy (e.g., along the insertion/extraction axis). Further, the brace holder structure may include (e.g., be composed of) a suitable vibration isolation material. Further, the gasket may be attached to the ferrule portion may optionally also have one or more intermediate alignment struts to reduce rotational misalignment. These struts may be longer than the electrical connector and may engage first with compliant struts in a backplane receptacle to ensure that both the ferrule portion on a first device (e.g., a drive carrier) and the ferrule portion on a second device (e.g., backplane/midplane) are both sufficiently laterally and rotationally aligned to engage properly. Additionally, in one or more embodiments, a desired amount of rotational and lateral elastic compliancy may be accommodated by a resilient portion such as, e.g., a sponge shell. Further, isolation of sensitive optical connections from system vibration may be provided by a vibration isolation gasket attached to and surrounding the optical ferrule portion and the resilient portion.

Another exemplary optical connector (e.g., a receiving optical connector) may be supported on a support portion, e.g., a backplane, midplane, dongle, etc. located, or placed, within a brace holder recess. A resilient portion (e.g., a compliant, elastic, spongy, etc. buffer zone) may be located in the recess and attached proximate the rear of the ferrule portion to provide axial compliancy (e.g., along the insertion/extraction axis) for overtravel during engagement with a corresponding optical connector. Further, the brace holder may be firmly mechanically attached to, or formed as part of, the support structure and/or standard electrical connector receptacle.

Further, the optical couplings described herein may be use expanded beam optical technology such as found in, e.g., lensed MT or MXC ferrules. Still further, the exemplary optical connector apparatus, systems, and methods described herein may also not use dust shutters.

The exemplary optical connector apparatus, systems, and methods may be described as being configured to "separate out" the compliancy, or compliant movement, of the ferrule portions of the connectors. More specifically, all six degrees of movement (i.e., linear movement about an x-axis, linear movement about an y-axis, linear movement about an z-axis, rotational movement about an x-axis, rotational movement about an y-axis, rotational movement about an z-axis) may be separated, or dispersed, between the two connectors. For example, each connector may provide less than six degrees of compliant movement for its ferrule portion. In at least one embodiment, a first, or drive carrier, optical connector may include a ferrule portion having strong compliancy (e.g., greater than or equal to about 2 millimeters) of linear movement in either direction in a transverse plane normal to insertion/extraction axis, having medium compliancy (e.g., greater than or equal to about 1°) about all rotational axes in either direction, and having limited or no axial linear movement or compliancy (e.g., less than or equal to about 0.5 millimeters) along the insertion/extraction axis in any direction. Further, in at least one embodiment, a second, or receiving, optical connector may include a ferrule portion having strong axial compliancy to accommodate overtravel requirements, medium or no rotational compliancy along the insertion/extraction axis in any direction, limited or no lateral compliancy, and limited or no lateral rotational compliancy. By separating out these compliancies, or compliant movements, it may be possible to make small optical connectors.

Figure 5:
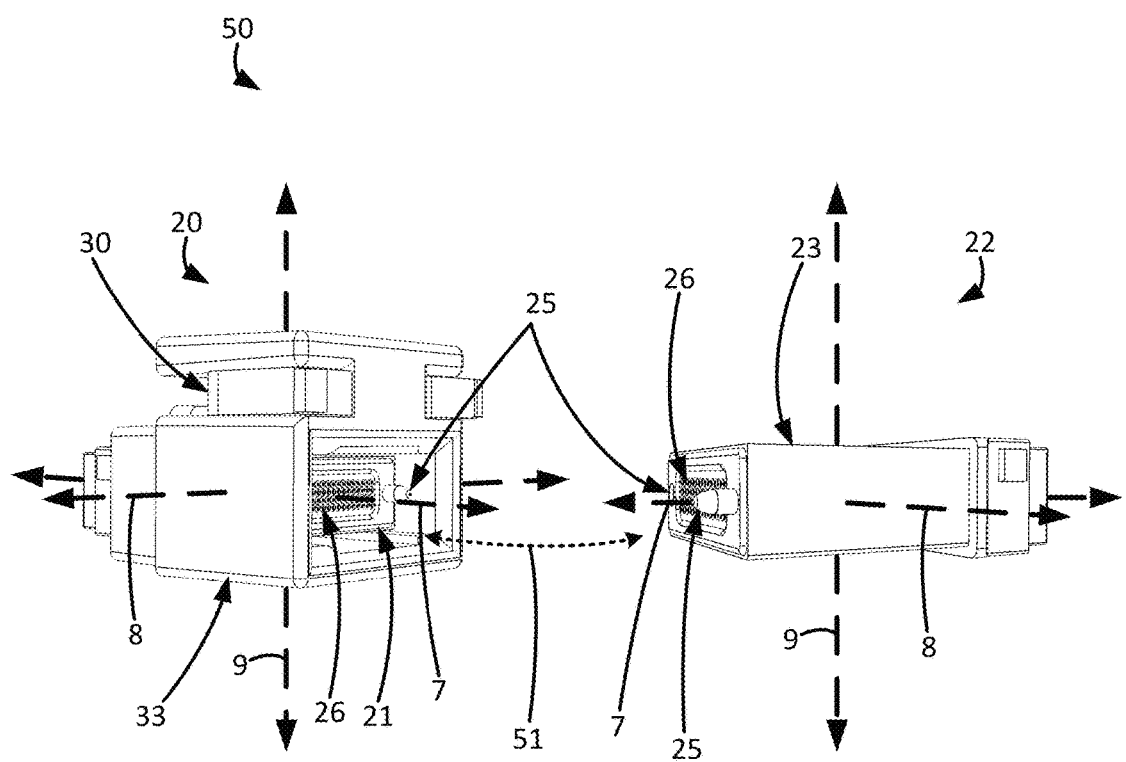
FIG. 5 is perspective view of an exemplary optical connector system.

An exemplary connector system 50 including a pair of corresponding optical connectors is depicted in FIG. 5. The exemplary system 50 includes a first connector 20 and a second connector 22 configured to be coupled together as indicated by arrow 51 similar to the systems 1 described herein with reference to FIG. 1. Each of the first and second connectors 20, 22 may include optical ferrule portions 21, 23, respectively. Further, each of the optical ferrule portions 21, 23 include a plurality of optical couplings 26 that will be optically coupled to each other when the first connector 20 is coupled to the second connector 22. Still further, it is to be understood that, although each of the optical ferrule portions 21, 23 include a plurality of optical couplings 26, or more specifically, 64 optical couplings 26, each of the optical ferrule portions 21, 23 may include as few as a single optical coupling or more or less than 64 optical couplings. In at least one embodiment, each of the optical ferrule portions 21, 23 may include one optical coupling 26. In at least one embodiment, each of the optical ferrule portions 21, 23 may include more than about 16 optical couplings 26. In at least one embodiment, each of the optical ferrule portions 21, 23 may include more than about 32 optical couplings 26.

Figure 6A:
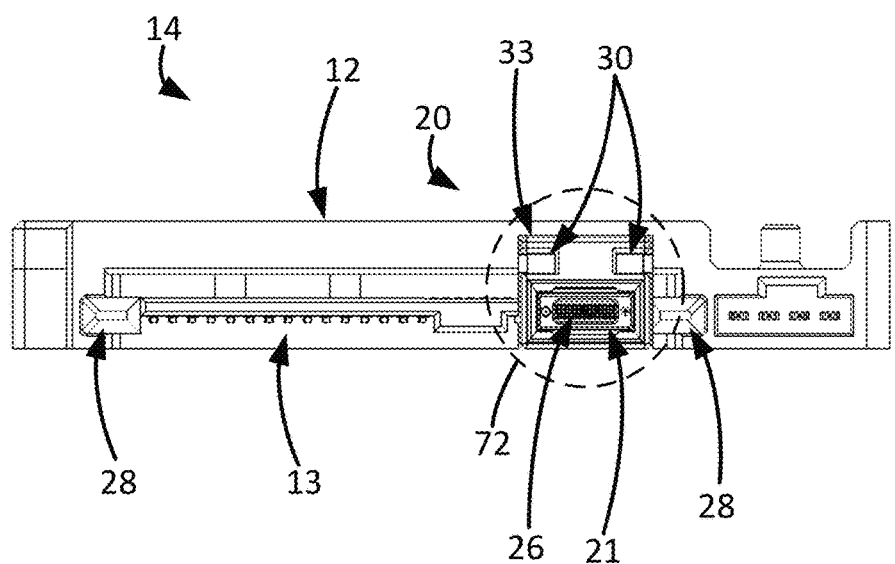
FIG. 6A is an end view of the first exemplary optical connector of the system of FIG. 5 and a first device coupled thereto.
Figure 6B:
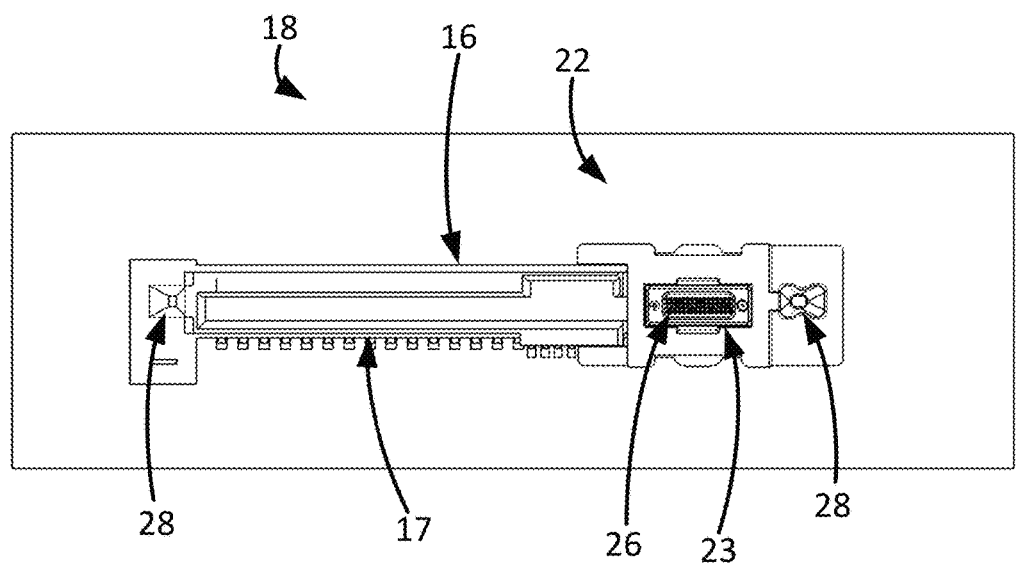
FIG. 6B is an end view of the second exemplary optical connector of the system of FIG. 5 and a first device coupled thereto.

As shown, each of the first and second optical ferrule portions 21, 23 include, or define, corresponding alignment features 25 configured to align the first and second connectors 20, 22 during coupling. As described herein, the first connector 20 may be coupled to and/or part of a first support portion 12 of a first device 14 as shown in FIG. 6A and the second connector 22 may be coupled to a second support portion 16 of a second device 18 as shown in FIG. 6B.

Each of the first and second support portions 12, 16 (and/or devices 14, 18) may include and define one or more alignment features 28 that are configured to "coarsely" align the support portions 12, 16 and the electrical connectors 13, 17 thereon for coupling. It may be described that the alignment features 28 provide enough alignment to place, or locate, the optical connectors 20, 22 close to, or near, alignment but not enough to consistently, effectively allow proper coupling of the optical connectors 20, 22 (e.g., proper coupling of the optical couplings 26 of the optical ferrule portions 21, 23 of the connectors 20, 22, respectively).

Figure 7A:
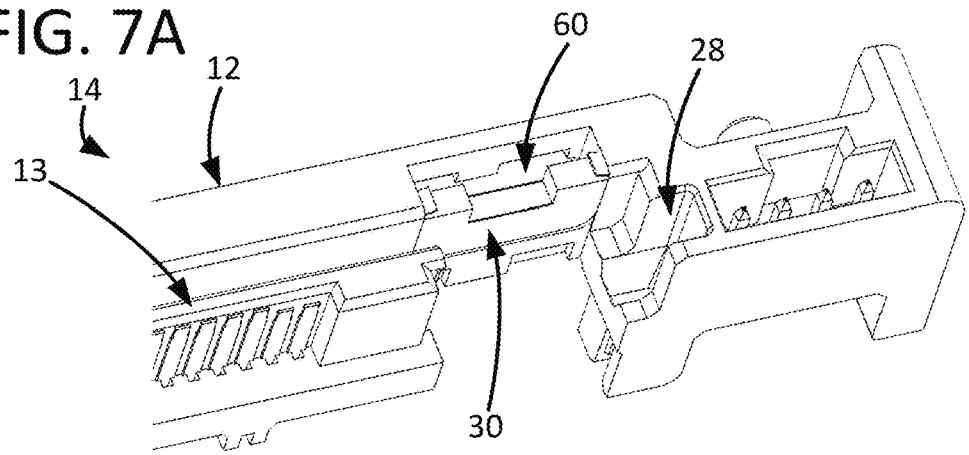
FIG. 7A is a perspective view of the first exemplary optical connector of the system of FIG. 5 without ferrule and socket portions.

To provide the proper coupling, the optical connectors 20, 22 provide, or allow, a plurality of degrees of movement of the respective optical ferrules portions 21, 23. To provide at least some of the plurality of degrees of movement, the first connector 20 includes a first resilient portion 30 as shown in FIG. 7A (which does not depict the socket, or wing, portion 33 and the first ferrule portion 21) that is coupled to a first support portion 12 of first device 14. The resilient portion 30 may include (e.g., be formed of) one or more materials such as, e.g., one or more polymers, one or more rubber materials, one or more metals (e.g., springs), any elastomeric or resilient foam compounds, etc. For example, although not shown, a resilient portion may include one or more metal springs (e.g., if more force, or backforce, is used or required, for more durability over many insertion/retraction cycles, etc.)

Figure 7B:
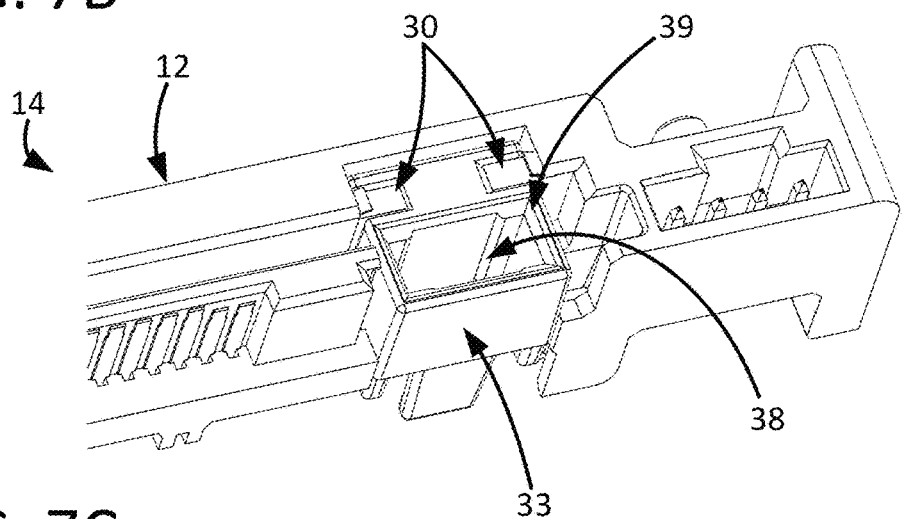
FIG. 7B is a perspective view of the first exemplary optical connector of the system of FIG. 5 without the ferrule portion.
Figure 7C:
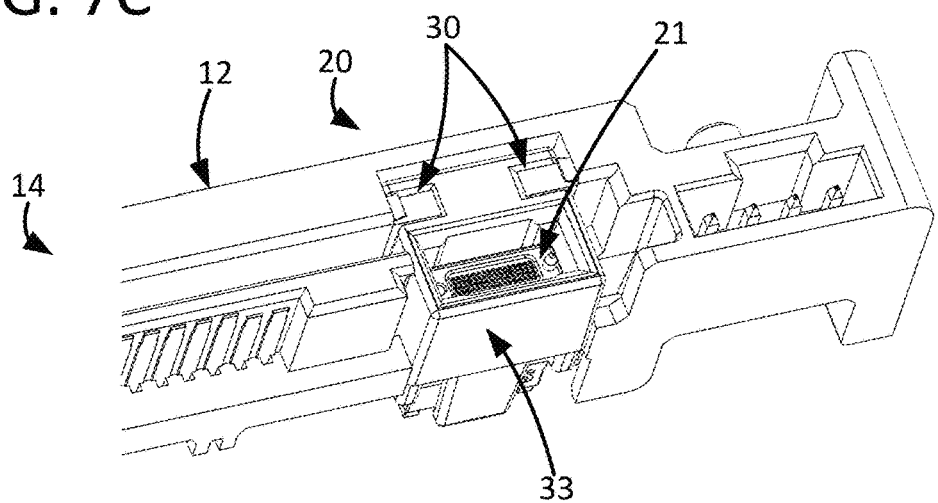
FIG. 7C is a perspective view of the first exemplary optical connector of the system of FIG. 5.

As shown in FIG. 7A, the first support portion 12 may define a notch area 60 configured to receive the first resilient portion 30. Further, the first resilient portion 30 in this embodiment defines a "U"-shape that is configured to receive a socket, or wing, portion 33 of the first connector 20 as shown in FIG. 7B. The socket portion 33 may be coupled to the first resilient portion 30 to provide the compliant movement of the first ferrule portion 21 with respect to the support portion 12 and the remainder of the first device 14.

Further, socket portion 33 may define a ferrule receiving opening 38 configured to receive the second ferrule portion 23. The ferrule receiving opening 38 may define a tapered edge region 39 about the mouth of the opening 38 configured to, e.g., provide a "medium" alignment feature for the coupling of the optical ferrule portions 21, 23. For example, the second ferrule portion 23 may engage, or contact, the tapered edge region 39 of the opening 38 before the alignment features 25 begin to engage with each other when the optical connectors 20, 22 are being coupled. The tapered edge region 39 and opening 38 may provide more "fine" alignment of the ferrule portions 21, 23 than the "coarse" alignment features 28 but less "fine" alignment than the alignment feature 25. In this way, the exemplary embodiments may be described as providing three levels, or tiers, of alignment features where each level, or tier, of alignment features provides different tolerances of alignment.

In other words, the exemplary systems, apparatus, structures, and methods described herein may provide three alignment levels for accurate engagement: "coarse alignment" by attaching the optical ferrule portions and other portions (e.g., gaskets) mechanically to legacy connectors with their own alignment structures; "intermediate alignment" by using optional longer alignment portions, or struts, (e.g., will engage first) that may be sufficient to allow the alignment structures of the optical ferrule portions to engage; and "fine alignment" through the precision alignment features of the optical ferrule portions to complete accurate engagement. Further, the optical ferrule portions may include optical couplings that are lensed (e.g., collimated expanded beam) to, e.g., make the optical couplings less sensitive to dust build-up, allow for more separation between opposing lenses, etc.

Figure 8:
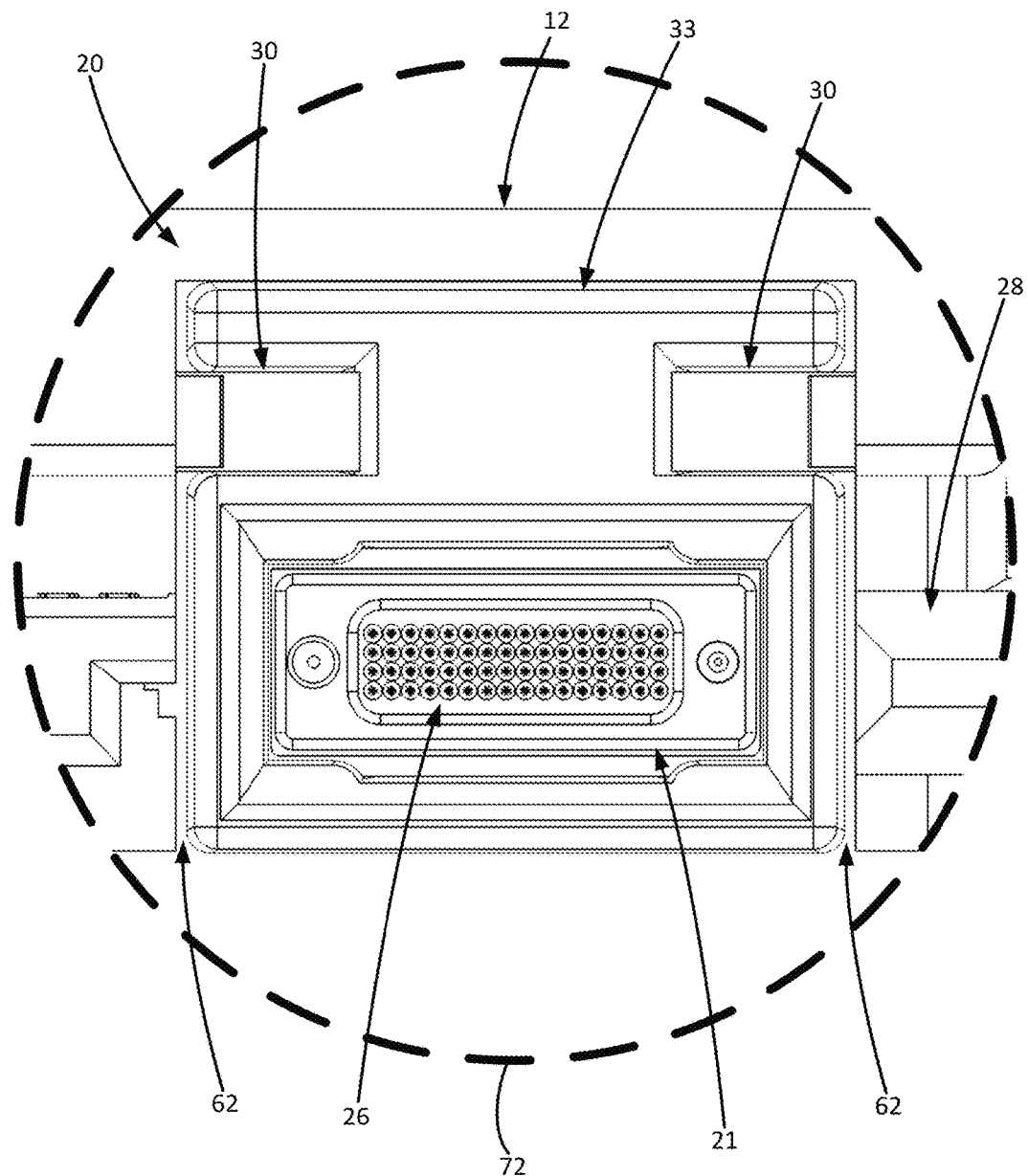
FIG. 8 is an expanded, end view of the first optical connector of the system of FIG. 5 expanded from FIG. 6A.

As shown in the expanded view of FIG. 8, the socket portion 33 may be sized such that a gap exists 62 between the socket portion 33 and the first support portion 12 such that the socket portion 33, and the first ferrule portion 21, can move with respect to the first support portion 12. In this embodiment, the first ferrule portion 21 may be movable (e.g., compliantly movable) in three degrees with respect to the first support portion 12. More specifically, the first ferrule portion 21 may be linearly movable along the first and third axes 7, 9 in either direction and rotationally movable about the third axis 9 in either direction with respect to the first support portion 12. For example, the first resilient portion 30 and the first ferrule portion 21 may be configured to provide linear movement along the first axis 7 between 0 millimeters and about 3.0 millimeters, linear movement along the second axis 8 between 0 millimeters and about 3.0 millimeters, and rotational movement about the third axis 9 between 0 degrees and about 5.0 degrees. In at least one embodiment, the first resilient portion 30 and the first ferrule portion 21 may be configured to provide about 2.0 millimeters or about 1.0 millimeters of linear movement along the first axis 7 in either direction, about 2.0 millimeters of linear movement along the second axis 8 in either direction, and about 3.0 degrees of rotational movement about the third axis 9 in either direction. In at least one embodiment, the first resilient portion 30 and the first ferrule portion 21 may be configured such that the first ferrule portion 21 is restricted from linearly moving along the third axis 9 and from rotationally moving about the first and second axes 7, 8.

Additionally, the second ferrule portion 23 may also have, or define, three degrees of movement. More specifically, the second connector 22 may be configured such that the second ferrule portion 23 is linearly movable along the third axis 9 in either direction and rotationally movable about the first and second axes 7, 8 in either direction. For example, the second connector 22 may be configured to provide linear movement along the third axis 9 between 0 millimeters and about 0.3 millimeters in either direction, rotational movement about the first axis 7 between 0 degrees and about 2 degrees, and rotational movement about the second axis 8 between 0 degrees and about 2 degrees. In at least one embodiment, the second resilient portion 32 and the second ferrule portion 23 may be configured to provide about 0.1 millimeters of linear movement along the third axis 9 in either direction, about 1.0 degrees of rotational movement about the first axis 7 in either direction, and about 1.0 degrees of rotational movement about the second axis 8 in either direction. In at least one embodiment, the second resilient portion 32 and the second ferrule portion 23 may be configured such that the second ferrule portion 23 is restricted from linearly moving along the first and second axes 7, 8 and from rotationally moving about the third axis 9.

Figure 9:
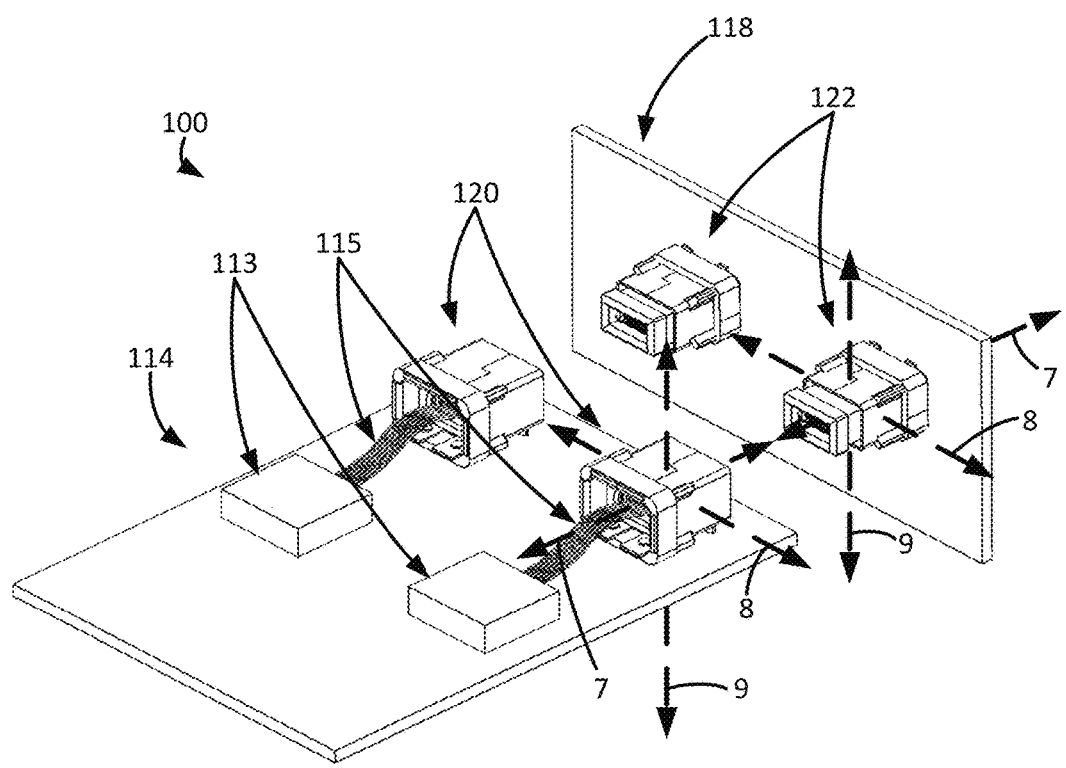
FIG. 9 is perspective view of an exemplary optical connector system including two pairs of corresponding optical connectors.

Another exemplary optical connector system 100 including two pairs of corresponding optical connectors is shown in FIG. 9. It is to be understood that the exemplary embodiments described herein may include one or a plurality of pairs of optical connectors on, or coupled to, one or a plurality of devices. As shown, the system 100 includes two first optical connectors 120 coupled to a first device 114 and two corresponding second optical connectors 122 coupled to a second device 118. The first optical connectors 120 are each coupled to optical engines 113 via optical pigtails 115.

In one or more embodiments, the first optical connectors 120 may be directly coupled to the optical engines 113, and the optical engines 113 may be coupled to one or more other electrical portions of the first device 114 via electrical pigtails. Further, when the first optical connectors 120 are directly coupled to the optical engines 113, the optical engines 113 may be configured to move with the movable optical ferrule portions 121 of the first optical connectors 120 (e.g., as shown in FIG. 10A).

Each pair of corresponding optical connectors 120, 122 may be configured to provide a plurality of degrees of movement to their optical ferrule portions 121, 123, respectively, with respect to the support portions or structures. For example, each of the optical connectors 120, 122 may provide six degrees of movement, i.e., linearly about a first axis 7, linearly about a second axis 8 perpendicular to the first axis 7, linearly about a third axis 9 perpendicular to the first and second axes 7, 8, rotationally about the first axis 7, rotationally about the second axis 8, and rotationally about the third axis 9, to their respective ferrule portions 121, 123.

Figure 10A:
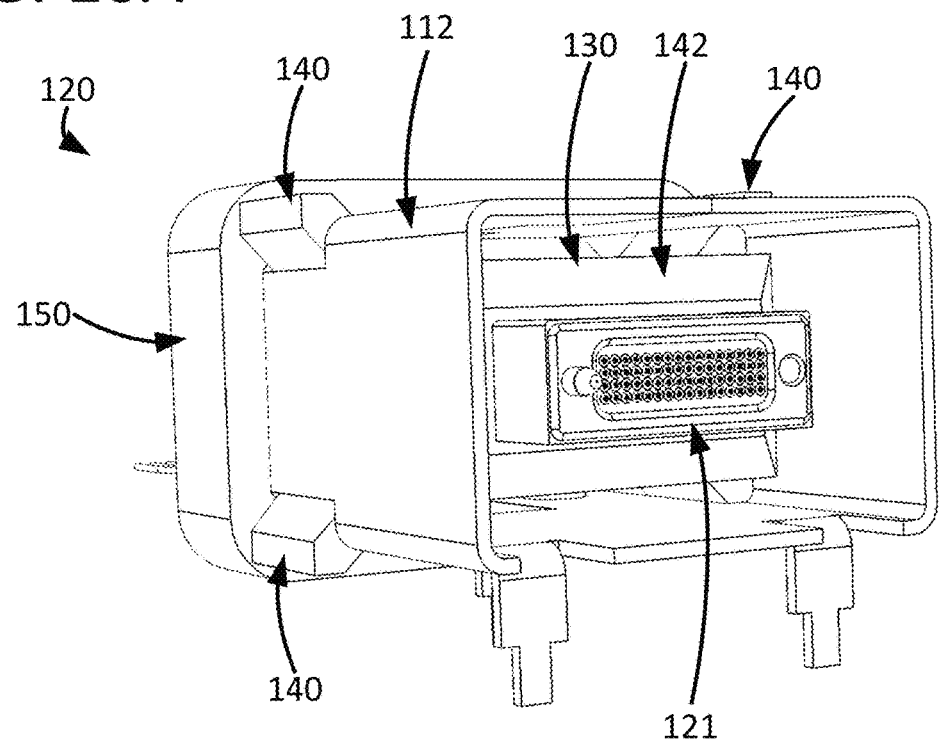
FIG. 10A is a perspective view of the first exemplary optical connector of the system of FIG. 9.
Figure 10B:
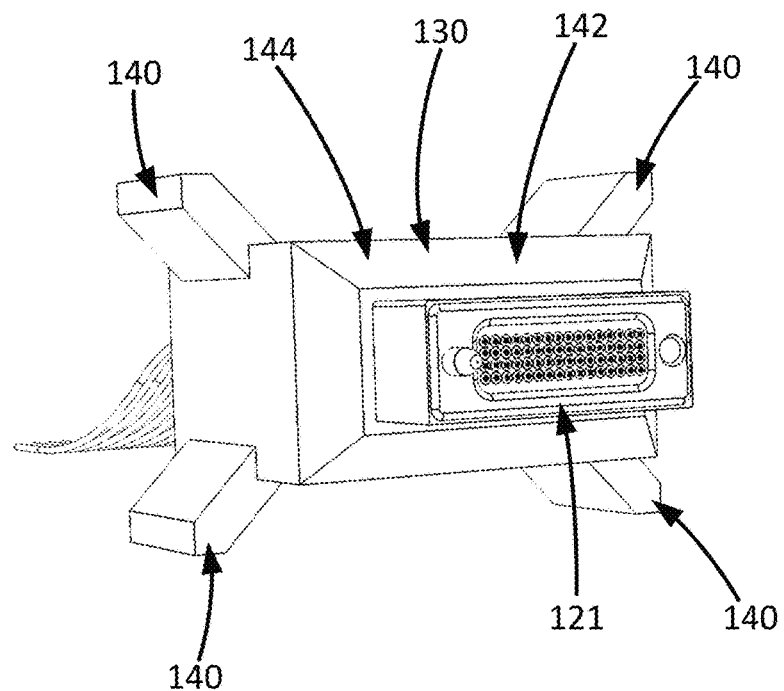
FIG. 10B is a perspective view of the first exemplary optical connector of the system of FIG. 9 without support and retainer portions.
Figure 11A:
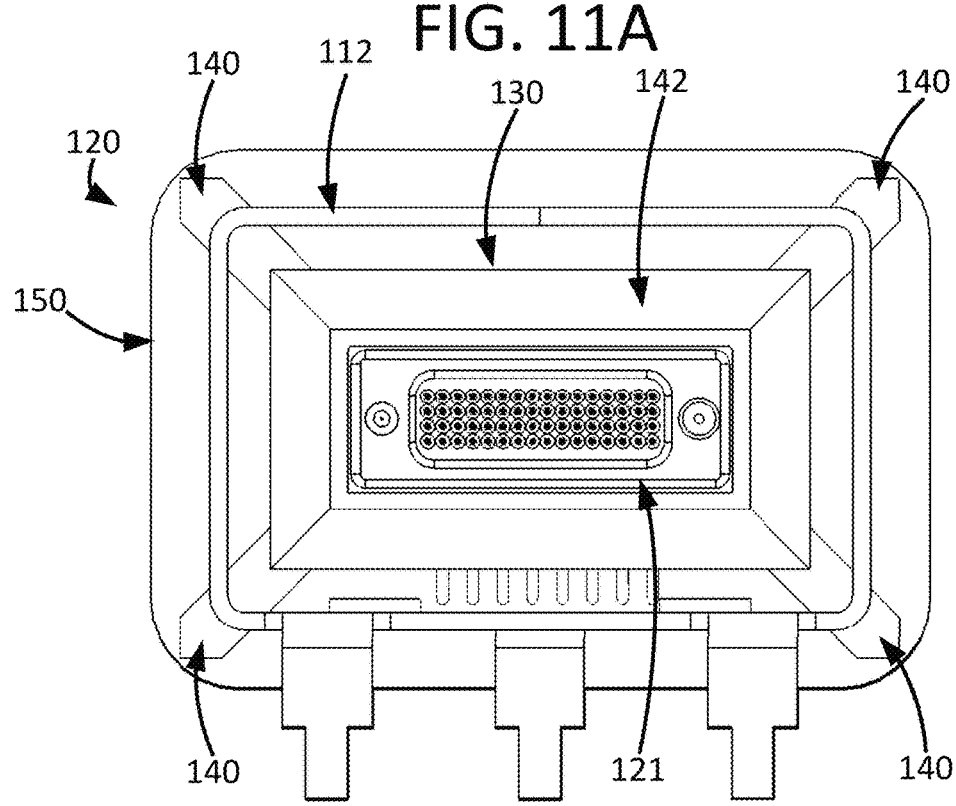
FIG. 11A is an end view of the first exemplary optical connector of the system of FIG. 9 with the first resilient portion in a normal state.
Figure 11B:
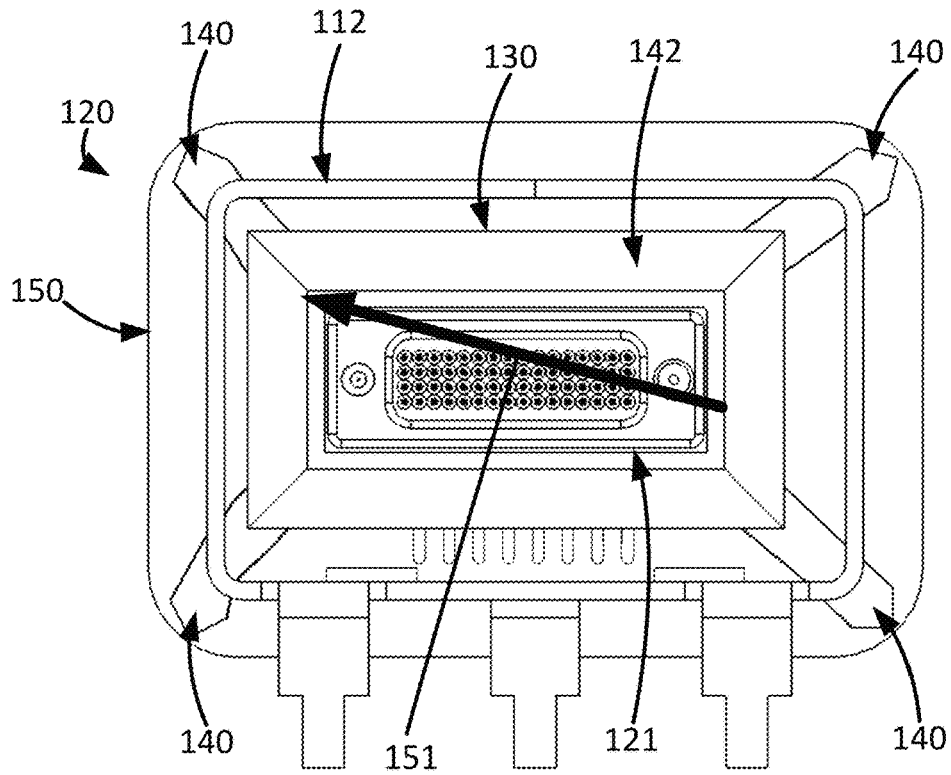
FIG. 11B is an end view of the first exemplary optical connector of the system of FIG. 9 with the first resilient portion in a deformed state.

To provide the six degrees of movement, the first optical connector 120 may include a first resilient portion 130 coupled to a first support portion 112 as shown in FIG. 10A. The first support portion 112 may be coupled to the first device 114 shown in FIG. 9. The first resilient portion 130 may include a plurality of extension portions 140 extending from a central portion 142 surrounding, or wrapped around, the first ferrule portion 121. The extension portions 140 may extend through openings in the first support portion 112 to, e.g., hold or couple the first resilient portion 130 to the first support portion 112. Further, a coupling, or band, portion 150 may be located around the first support portion 112 to hold, or maintain, the extension portions 140 of the first resilient portion 130 within the openings of the first support portion 112. In other words, the coupling, or band, portion 150 may be configured to couple (e.g., fixedly couple) the first resilient portion 130 to the first support portion 112. Further, the central portion 142 of the first resilient portion 130 may define a tapered region 144 configured to assist in the alignment of the first connector 120 with the second connector 122 for coupling.

The compliance, or resiliency, of the extension portions 140 and/or the central portion 142 of the first resilient portion 130 may allow, or provide, the movement of the first ferrule portion 121 when force is applied to the first ferrule portion 121. For example, the first ferrule portion 121 may be located in a natural state or position in FIG. 11A. More specifically, a force may not be applied to the first ferrule portion 121 in FIG. 11A, and thus, the first resilient portion 130 may not be deformed (e.g., in a non-deformed or natural state) that locates the first ferrule portion 121 in a natural or original location. A force in the direction 151 has been applied to the first ferrule portion 121 in FIG. 11B moving the first ferrule portion 121 into a deflected, or unnatural, position. More specifically, the force applied to the first ferrule portion 121 in direction 151 has deflected, or deformed, the first resilient portion 130 (e.g., in to a deformed state), which allows the first ferrule portion 121 to be moved to the deflected location. In other words, the compliancy, or resiliency, of the resilient portion 130 allow the first ferrule portion 121 to move in direction 151 when a force is applied to, e.g., assist in coupling of the first ferrule portion 121 to a corresponding optical ferrule portion.

The second exemplary optical connector 122 of the system 100 of FIG. 9 is depicted in FIG. 12. The second optical connector 122 may be similar to the first optical connector 120. For example, the second optical ferrule portion 123 of the second optical connector 122 may be movable linearly along and rotationally about the first, second, and third axes 7, 8, 9 through the use of a second resilient portion 132 coupling the second optical ferrule portion 123 to the support portion 116. Further, the second resilient portion 132 of the second optical connector 122 may include extension portions 140 extending from a central portion 142. The extension portions 140 may extend through openings in the support portion 116 and a coupling, or band, portion 150 may hold, or maintain, the extension portions 140, and thus, couple the second resilient portion 132 to the support portion 116.

In this embodiment, the second resilient portion 132 may further include an insertion portion 145 defining a ferrule reception opening 146 configured to receive the first ferrule portion 121 of the first optical connector 120. The insertion portion 145 may be described as extending from the central portion 142 over at least a portion of the second ferrule portion 123 and defining a dual-tapered, perimeter edge. The dual-tapered, perimeter edge may include an inner taper region 160 and an outer taper region 162. The inner taper region 160 may be configured to engaged and/or direct the first optical ferrule portion 121 inside of the ferrule reception opening 146 to be coupled with the second optical ferrule portion 123 and the outer taper region 162 may be configured to engage with the first support portion 112 to direct the second resilient portion 132 and the second ferrule portion 123 towards the first optical ferrule portion 121.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above", "below", etc. may be used in this disclosure. These terms should not be construed as limiting the position or orientation of a structure, but should be used as providing spatial relationship between the structures.

Embodiments of the systems, apparatus, and methods for measuring latency in a storage device are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A connector comprising:
an optical ferrule portion comprising an optical coupling to be coupled to a corresponding optical ferrule portion, the optical coupling aligned parallel to a first axis extending through the optical ferrule portion; and
a resilient portion coupling the optical ferrule portion to a support, the resilient portion providing compliant linear movement of the optical ferrule portion with respect to the support portion along the first axis in either direction and along a second axis in either direction and compliant rotational movement about a third axis in either direction to align the optical ferrule portion with the corresponding optical ferrule portion for coupling the optical ferrule portion to the corresponding optical ferrule, the second axis perpendicular to the first axis and the third axis perpendicular to the first and the second axes.

2. The connector of claim 1, wherein the resilient portion further provides greater than or equal to about 0.5 degrees of compliant rotational movement of the optical ferrule portion about the third axis in either direction.

3. The connector of claim 1, wherein the resilient portion further provides greater than or equal to about 1 millimeter of compliant linear movement of the optical ferrule portion along the first axis in either direction.

4. The connector of claim 1, wherein the resilient portion further restricts linear movement of the optical ferrule portion along the third axis in either direction.

5. The connector of claim 1, wherein the resilient portion further restricts rotational movement of the optical ferrule portion about the first and second axes in either direction.

6. The connector of claim 1, the connector further comprising a receptacle fixedly coupled to the support and defining an insertion opening, the optical ferrule portion positioned within the insertion opening, the receptacle configured to direct the corresponding optical ferrule portion into the insertion opening to be coupled to the optical ferrule portion.

7. The connector of claim 1, wherein the resilient portion defines an insertion opening, the optical ferrule portion positioned within the insertion opening, the receptacle configured to direct the corresponding optical ferrule portion into the insertion opening to be coupled to the optical ferrule portion.

8. The connector of claim 1, wherein the resilient portion further provides compliant linear movement of the optical ferrule portion with respect to the support portion along the third axis in either direction and compliant rotational movement about the first axis in either direction and about the second axis in either direction.

9. The connector of claim 1, wherein the optical ferrule portion comprises an alignment feature configured to be mated with a corresponding alignment feature of the corresponding optical ferrule portion, wherein the compliant movement provided by the resilient portion allows the optical ferrule portion to move into alignment with the corresponding optical ferrule portion when the alignment feature is being mated to the alignment feature of the corresponding optical ferrule portion.

10. The connector of claim 1, the connector further comprising an electrical coupling portion coupled to the support and configured to be coupled to a corresponding electrical coupling portion, the electrical coupling portion comprising a coarse alignment feature configured to align the electrical coupling portion for coupling to the corresponding electrical coupling portion.

11. The connector of claim 1, wherein the resilient portion is deformable under application of a force from a normal state to a deformed state to provide the compliant movement of the optical ferrule portion, wherein the resilient portion returns to the normal state when the force is removed.

* * * * *